United States Patent [19]
Rochte

[11] Patent Number: 5,197,343
[45] Date of Patent: Mar. 30, 1993

[54] FRICTION DRIVE FOR ROTARY TO LINEAR MOTION

[76] Inventor: Jerry E. Rochte, 196 Sunkist La., Los Altos, Calif. 94022

[21] Appl. No.: 791,966

[22] Filed: Nov. 13, 1991

[51] Int. Cl.⁵ .............................................. F16H 13/10
[52] U.S. Cl. ...................................... 74/89; 100/160; 100/171; 271/274
[58] Field of Search ............... 74/89, 99 R, 206, 209; 100/160, 171; 198/624; 271/274

[56] References Cited

U.S. PATENT DOCUMENTS

| | | | |
|---|---|---|---|
| 1,442,838 | 1/1923 | West | 198/624 |
| 4,378,709 | 4/1983 | Chitayat | 74/89 X |
| 4,444,069 | 4/1984 | Dangschat | 74/209 |
| 4,539,854 | 9/1985 | Bradshaw et al. | 74/206 X |

Primary Examiner—Allan D. Herrmann
Attorney, Agent, or Firm—Julian Caplan

[57] ABSTRACT

A driven member has flat parallel top and bottom surfaces over at least a portion of its length. A motor actuated drive roller is mounted between two parallel, spaced side plates between which the driven member reciprocates and bears against the driven member. Back-up rollers engage the drive roller to prevent the pinion from backing away from the driven member. A spring-mounted pressure roller bears against the side of the driven member directly opposite the drive roller. As the motor turns the drive roller, the latter frictionally engages the driven member and causes the latter to move linearly without the backlash characteristic of rack and pinion mechanisms.

4 Claims, 2 Drawing Sheets

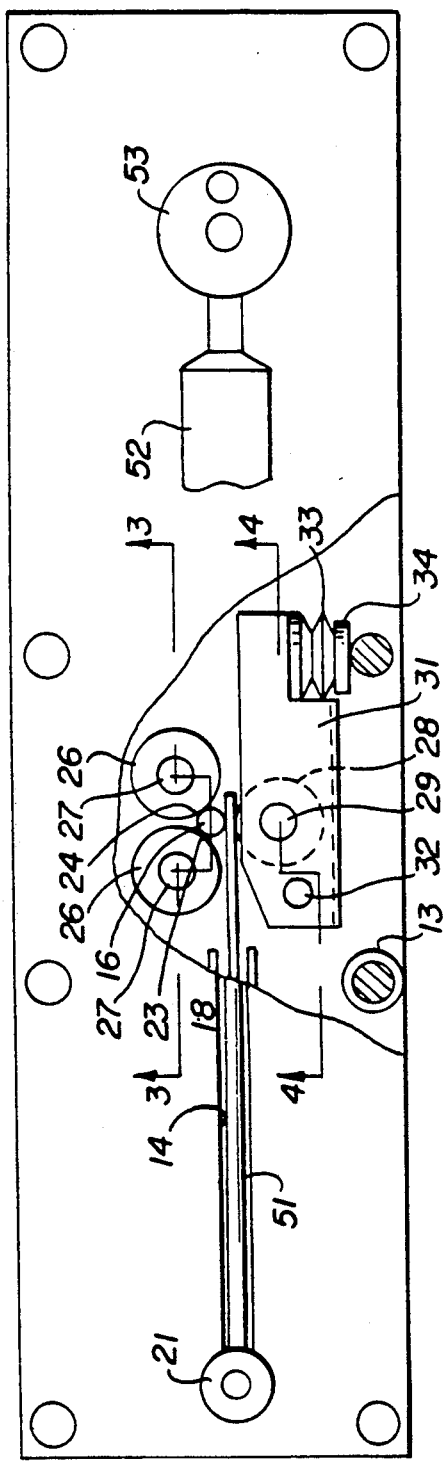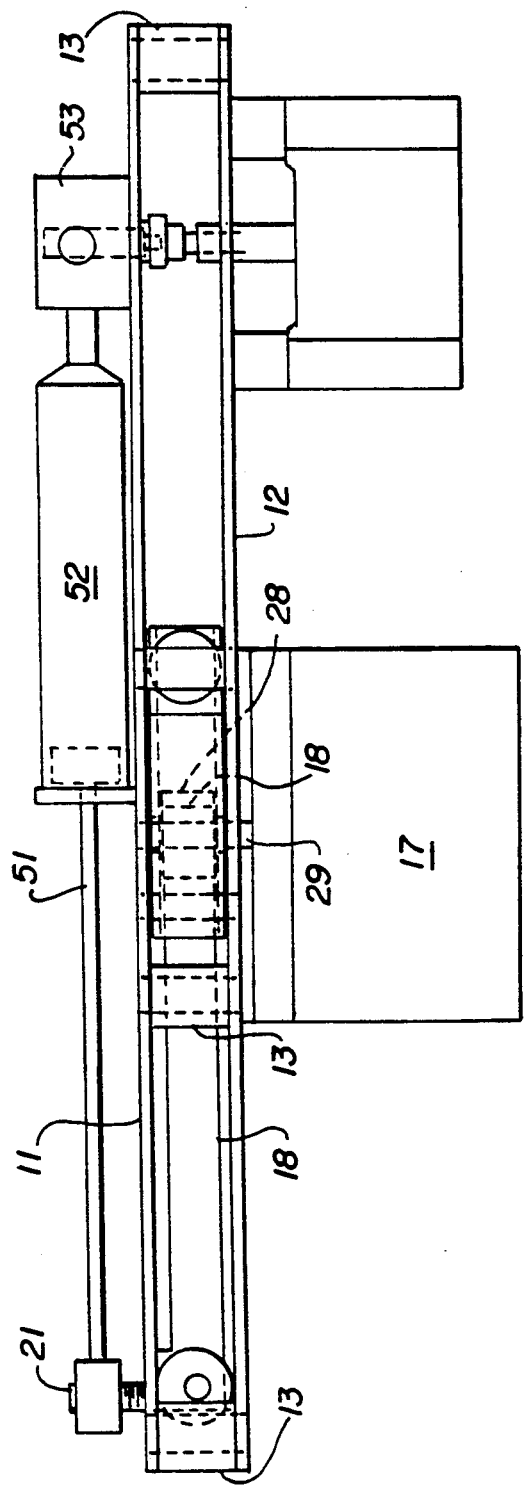

5,197,343

FRICTION DRIVE FOR ROTARY TO LINEAR MOTION

BACKGROUND OF THE INVENTION

1. Field of the Invention

This invention relates to a new and improved drive mechanism whereby a motor driven drive roller frictionally engages a flat surface of an elongated driven member. A pressure roller is spring biased to bear against the driven member directly opposite the drive member.

2. Description of Related Art

This invention comprises an improvement on U.S. Pat. No. 4,539,854. In this reference there are two support rollers spaced longitudinally relative to the driven member on either side of the drive roller, one of the support rollers being spring biased. The present invention comprises an improvement on said patent because only a single support roller is used and the support roller is spring biased and bears against the driven member directly opposite the drive roller. Alignment problems are considerably reduced.

Another improvement of the present invention over the prior art is that the driven member in this instance has an elongated platen parallel to the sides against which the driven member revolves thereby eliminating the necessity of precisely positioning the rollers in a single plane or exactly 90° apart.

SUMMARY OF THE INVENTION

The present invention converts rotary motion to linear motion by means of a drive roller which frictionally engages an elongated driven member which has parallel, elongated first and second surfaces. The drive member bears against one said surface and a spring biased pressure roller bears against the second surface directly opposite the drive roller. By way of analogy, the drive roller may be considered a pinion and the driven member a rack. Employing a friction drive, rather than a toothed drive, eliminates the backlash which is inherent in conventional rack and pinion drives.

Alignment of the members is improved in accordance with this invention as compared with the prior art because the pressure roller is directly opposite the drive roller.

Another advantage of the invention is that it eliminates the problem of positioning the various rollers in a single plane or exactly 90° apart, because the driven member is a flat plate or at least the driven member has elongated flat parallel surfaces engaged by the drive roller.

Another advantage of the invention is the fact that fewer parts are required.

Still another feature of the invention is that a pressure roller is mounted in a yoke which is pivoted and spring biased so that the pressure roller applies a greater force to the driven member with no distortion of the driven member and no alignment problems.

Still another feature of the invention is the fact that the present invention, which does not require the use of a toothed rack eliminates the problems of construction of such racks.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a side elevational view of the drive mechanism, partially broken away in section to reveal internal construction and with some parts removed.

FIG. 2 is a plan view showing the parts in one position in solid lines and in another position in dotted lines.

DETAILED DESCRIPTION OF THE PREFERRED EMBODIMENT

Figure 4:
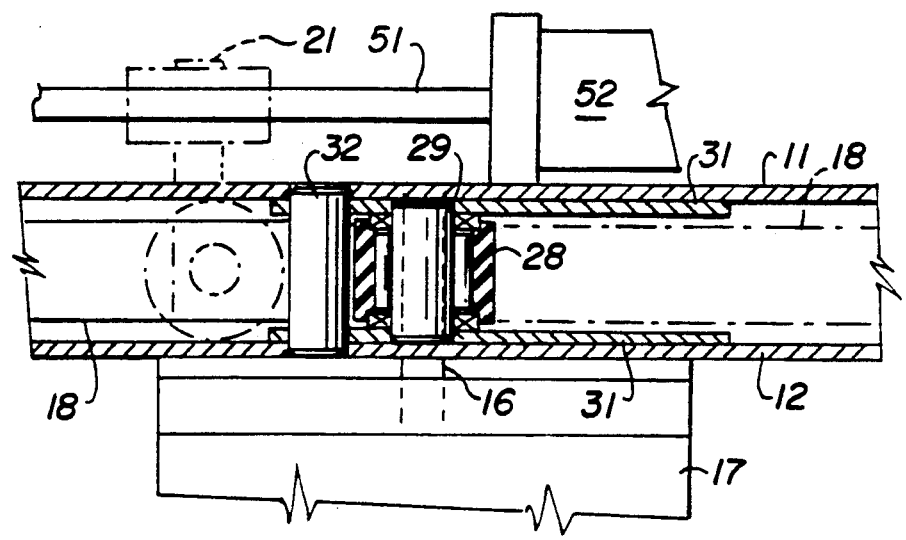
FIG. 4 is a sectional view taken substantially along line 4—4 of FIG. 1.
Figure 3:
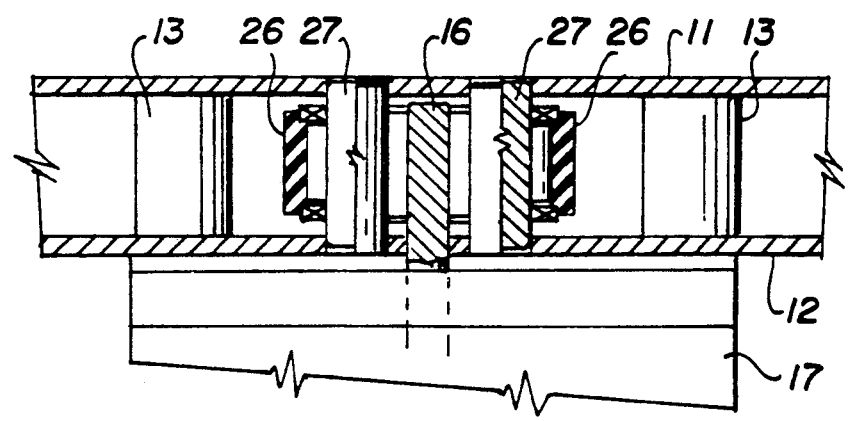
FIG. 3 is a sectional view taken substantially along line 3—3 of FIG. 1.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The frame of the present invention is provided by first and second side plates 11,12 which are spaced apart in parallel condition by a plurality of spacers 13. The first plate 11 is formed with a slot 14 of a length slightly greater than the travel of the driven member 18.

Rotatably mounted between the plates 11,12 is driven roller 16 (which may be analogized to a pinion). Roller 16 is turned by a reversible motor 17 supported by plate 12. Reciprocable between the plates 11,12 is a driven member 18 (which may be analogized to a rack). The driven member 18 has flat parallel surfaces and one of these surfaces is engaged by the drive roller 16. As motor 17 turns roller 16 in either direction, the driven member 18 is caused to move by frictional engagement of the roller 16 with one flat surface of member 18. Connector 21 attached to member 18 extends up through slot 14 and reciprocates with the member 18. Back-up rollers 26 bear against drive roller 16 on either side thereof along first and second lines of contact 23 and 24, shown in FIG. 1 as points. Back-up rollers 26 prevent the pressure of the driven member 18 against the roller 16 distorting the alignment thereof and its shaft. The shafts 27 of rollers 26 are journaled in the plates 11,12.

Pressure roller 28 is mounted on the side of driven member 18 directly opposite drive roller 16. Its shaft 29 is journaled in a yoke 31, yoke 31 being pivoted by pivot 32 between the plates 11,12. Spring 33 bears against yoke 31 and spring support 34 and biases the roller 28 against the driven member 18 with considerable force to insure the frictional engagement between the parts.

In operation, motor 17 is turned in either direction, thereby turning drive roller 16. Roller 16 is held against one of the flat surfaces of driven member 18 by the force of the backup rollers 26 bearing against roller 16. Pressure roller 18 bears against driven member 18 and forces it into frictional engagement with drive roller 16. Thus the member 18 may be caused to reciprocate, the connector or drive pin 21 extending through slot 14 and reciprocating.

A preferred use for the present invention is in a fluid metering system similar to that described in U.S. Pat.

No. 4,539,854. Thus the connector 21 may be connected to the plunger 51 of a syringe 52. The syringe discharges into one of the ports of the 3-way valve 53. One port of the valve is connected to a source of liquid and the other port constitutes a discharge port. As the driven member 18 reciprocates, the valve 53 is actuated (by any suitable means) so that on retraction of the driven member 18, liquid is drawn from the source through the valve 53 to the syringe 52. At the end of the retraction stroke of the member 18, the motor 17 stops and the valve 53 is turned. When the motor 17 is reversed, the drive member 18 is projected, forcing a metered quantity of liquid from the syringe 52 out the discharge port of the valve 53.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A friction drive converting rotary to linear motion comprising
    a housing, a drive roller mounted in said housing, first and second back-up rollers mounted in said housing bearing against said drive roller on first and second lines, respectively, each parallel to the other and located on opposite sides of said drive roller, said drive roller and said back-up rollers having opposite ends rotatably mounted in said housing about axes fixed relative to each other, drive means for turning said drive roller,
    pressure roller having opposite ends,
    a driven member having at least one flat surface perpendicular to a line joining the axes of rotation of said drive roller and said pressure roller and parallel to said first and second lines and a second surface opposite said one flat surface, said drive roller frictionally engaging said one flat surface and said pressure roller engaging said second surface to cause reciprocable motion of said housing and said driven member relative to each other as said drive means turns said drive roller,
    a yoke within said housing having a pair of parallel arms in which said opposite ends of said pressure roller are rotatably mounted, pivot means pivoting said yoke to said housing about a single pivot axis parallel to the axis of rotation of said pressure roller, and resilient means comprising a single spring applying substantially equal pressure against both arms of said yoke at points remote from said pivot means.

2. A drive according to claim 1 in which said second surface of said driven member is flat and parallel to said one flat surface.

3. A drive according to claim 1 in which said housing comprises a plate formed with a slot parallel to said driven member and which further comprises a connector attached to said driven member and extending through said slot.

4. A drive according to claim 1 which further comprises a guide mounted in said housing shaped to receive and support at least a portion of said driven member.

* * * * *